US011146939B2

(12) United States Patent
Lindholm et al.

(10) Patent No.: US 11,146,939 B2
(45) Date of Patent: Oct. 12, 2021

(54) IMS EMERGENCY CALLS FOR ROAMING UES (71) Applicant: TELEFONAKTIEBOLAGET LM ERICSSON (PUBL), Stockholm (SE)

(72) Inventors: Fredrik Lindholm, Tokyo (JP); Ralf Keller, Würselen (DE); Susana Fernandez Alonso, Madrid (ES); Ivo Sedlacek, Hovorcovice (CZ)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 162 days.

(21) Appl. No.: 16/415,119

(22) Filed: May 17, 2019

(65) Prior Publication Data

US 2019/0274025 A1 Sep. 5, 2019

Related U.S. Application Data (63) Continuation of application No. 15/558,890, filed as application No. PCT/EP2015/057265 on Apr. 1, 2015.

(51) Int. Cl.
*H04W 4/90* (2018.01)
*H04W 76/50* (2018.01)
(Continued)

(52) U.S. Cl.
CPC .......... *H04W 4/90* (2018.02); *H04L 65/1006* (2013.01); *H04L 65/1016* (2013.01);
(Continued)

(58) Field of Classification Search
CPC ........... H04L 65/1006; H04L 65/1016; H04L 65/105; H04L 65/1069; H04L 65/1073;
(Continued)

(56) References Cited

U.S. PATENT DOCUMENTS 7,899,174 B1    3/2011  Constantinof
8,848,666 B2    9/2014  Keller
                        (Continued)

FOREIGN PATENT DOCUMENTS

CN    101296504 A    10/2008
CN    101448242 A     6/2009
                     (Continued)

OTHER PUBLICATIONS

Chinese Patent Application No. 2015800785461, Office Action dated Jun. 19, 2020, 7 pages.
(Continued)

*Primary Examiner* — Asad M Nawaz
*Assistant Examiner* — Kai Chang
(74) *Attorney, Agent, or Firm* — Sage Patent Group (57) ABSTRACT A method in a proxy call session control function, P-CSCF, of handling an unauthenticated emergency call originating from a roaming user equipment that is not attached to the P-CSCF. The P-CSCF receives a session initiation protocol (SIP) REGISTER request from the UE, where the REGISTER request relating to the emergency registration. The P-CSCF determines an IP address of the UE. The P-CSCF sends an identity query to a policy and charging rules function (PCRF) indicating the IP address of the UE and requesting other identifiers of the UE. The P-CSCF receives one or more other identifiers of the UE from the PCRF. The P-CSCF obtains a TEL and/or SIP uniform resource identifier (URI) for the UE on the basis of at least one of the one or more other identifiers. The P-CSCF sends a 200 OK response to the UE in response to the SIP REGISTER request, where the 200 OK response includes the TEL and/or SIP URI. Also provided are corresponding methods in other nodes and for authenticated emergency calls, and apparatus for implementing the methods.

20 Claims, 5 Drawing Sheets (51) Int. Cl.
   *H04L 29/06* (2006.01)
   *H04W 60/00* (2009.01)
   *H04M 3/51* (2006.01)
   *H04W 80/10* (2009.01)
   *H04W 8/20* (2009.01)
   *H04W 92/02* (2009.01)
   *H04W 12/06* (2021.01)
   *H04W 12/72* (2021.01)

(52) U.S. Cl.
   CPC ...... *H04L 65/1069* (2013.01); *H04L 65/1073* (2013.01); *H04W 60/00* (2013.01); *H04W 76/50* (2018.02); *H04L 65/105* (2013.01); *H04M 3/5116* (2013.01); *H04W 8/20* (2013.01); *H04W 12/06* (2013.01); *H04W 12/72* (2021.01); *H04W 80/10* (2013.01); *H04W 92/02* (2013.01)

(58) Field of Classification Search
   CPC ....... H04M 3/5116; H04W 4/90; H04W 8/20; H04W 12/00514; H04W 12/06; H04W 12/12; H04W 60/00; H04W 76/50; H04W 80/10; H04W 92/02
   See application file for complete search history.

(56) References Cited

U.S. PATENT DOCUMENTS

| | | | |
|---|---|---|---|
| 9,332,041 B2 | 5/2016 | Bakker et al. | |
| 2008/0008157 A1* | 1/2008 | Edge | H04W 4/90 370/351 |
| 2009/0093249 A1 | 4/2009 | Zhu et al. | |
| 2009/0196269 A1* | 8/2009 | Agarwal | H04W 72/10 370/341 |
| 2009/0264095 A1 | 10/2009 | Khetawat et al. | |
| 2010/0146096 A1* | 6/2010 | Takahashi | H04L 65/1046 709/223 |
| 2010/0246780 A1* | 9/2010 | Bakker | H04L 65/1096 379/38 |
| 2011/0032906 A1 | 2/2011 | Mutikainen | |
| 2011/0141979 A1 | 6/2011 | Keller | |
| 2011/0216763 A1* | 9/2011 | Wahl | H04L 61/605 370/352 |
| 2012/0173736 A1 | 7/2012 | Klein | |
| 2013/0029629 A1* | 1/2013 | Lindholm | H04W 36/0022 455/404.1 |
| 2013/0279406 A1 | 10/2013 | Merinovazquez et al. | |
| 2014/0307589 A1* | 10/2014 | Li | H04L 67/1036 370/259 |
| 2014/0376414 A1 | 12/2014 | Edge et al. | |
| 2015/0019703 A1 | 1/2015 | Ludwig | |
| 2015/0237413 A1 | 8/2015 | Russell et al. | |
| 2015/0282108 A1* | 10/2015 | Kiss | H04L 65/1006 455/435.1 |
| 2016/0014586 A1 | 1/2016 | Stupar et al. | |
| 2016/0105784 A1 | 4/2016 | Gellens et al. | |
| 2018/0199180 A1* | 7/2018 | Edge | H04L 65/1069 |
| 2018/0352408 A1 | 12/2018 | Baer et al. | |
| 2019/0098133 A1* | 3/2019 | Poikselka | H04W 12/06 |

FOREIGN PATENT DOCUMENTS

| | | |
|---|---|---|
| CN | 102124713 A | 7/2011 |
| WO | 2008117165 A1 | 10/2008 |
| WO | 2013149650 A1 | 10/2013 |
| WO | 2013151484 A1 | 10/2013 |
| WO | 2016074747 A1 | 5/2016 |

OTHER PUBLICATIONS

3rd Generation Partnership Project; Technical Specification Group Services and System Aspects; IP Multimedia Subsystem (IMS) emergency sessions (Release 12), 3GPP TS 23.167 V12.1.0, Mar. 2015.

3rd Generation Partnership Project; Technical Specification Group Core Network and Terminals; Policy and Charging Control over Rx reference point (Release 13), 3GPP TS 29.214 V13.0.0, Dec. 2014.

3rd Generation Partnership Project; Technical Specification Group Core Network and Terminals; IP multimedia call control protocol based on Session Initiation Protocol (SIP) and Session Description Protocol (SOP); Stage 3 (Release 13), 3GPP TS 24.229 V13.0.0, Dec. 2014.

European Search Report and Opinion for European Patent Application No. 21167639.0 dated Jul. 15, 2021.

* cited by examiner

IMS EMERGENCY CALLS FOR ROAMING UES

PRIORITY

This application is a continuation of U.S. application Ser. No. 15/558,890, filed Sep. 15, 2017, which is a 371 of International Application No. PCT/EP2015/057265, filed Apr. 1, 2015, the disclosures of which are fully incorporated herein by reference.

TECHNICAL FIELD

The present invention relates to emergency calls in an IP multimedia subsystem, IMS, enabled network. In particular, the invention relates to methods and apparatuses for enabling emergency calls for roaming UEs on the network.

BACKGROUND

In the context of a cellular telephone network, an unauthenticated mobile emergency call is an emergency call where the identity of the subscriber is not asserted by the network. A call to a Public Safety Answering Point (PSAP), i.e. an emergency centre, where the subscriber's number is not visible, may also be considered an unauthenticated mobile emergency call. Such unauthenticated calls have been permitted in order to allow an emergency call to be made despite normal telephone services being unavailable to a particular user terminal. Unauthenticated calls can occur, for example, where a user has a valid subscription but his operator does not have a roaming agreement with the operator the user is camping on. An example can be when the user is in an area where only his operator's competitor has coverage, or when a user is travelling abroad.

In contrast, an authenticated emergency call is one where the network verifies the identity (or identities) of the subscriber associated with the UE and indicates the asserted identity to the PSAP. Authenticated calls are preferred as they allow the PSAP operators to call the user in case of disconnection, and to identify the person who made a hoax call.

Taking Sweden as an example, the number of unauthenticated emergency calls in the year 2000 was of the order of 700000, contributing around 18% of all emergency calls from the mobile networks. Out of these 700000 unauthenticated calls, only 1.5% were made in respect of real emergencies. The possibility of making unauthenticated calls encourages hoax calls, as the callers can effectively remain anonymous. In some countries including the UK, network operators have inhibited unauthenticated calls on mobile networks in an attempt to reduce the number of hoax calls. Of course, this in turn prevents users from making valid emergency calls on those rare occasions when only an unauthenticated terminal is available.

Current IMS roaming standards allow a user, e.g. in a foreign country, to connect to the IMS of their home network without the need for a SIP interconnect between the home PLMN (HPLMN) and the visited PLMN (VPLMN). When IMS roaming is performed without a SIP interconnect, the UE attaches to a radio network (e.g. E-UTRAN) and a packet core network (e.g. EPC) and makes IMS voice calls using an IMS PDN connection with the P-GW of the HPLMN, without any IMS entity of the VPLMN becoming involved. However, if the roaming UE wishes to make an IMS emergency call, this must be routed via the VPLMN. At this point, a problem occurs. The authenticated IMS emergency call must be preceded by a successful IMS emergency registration with the VPLMN. However, the VPLMN's P-CSCF cannot route the IMS emergency registration to HPLMN's IMS core network due to the lack of SIP interconnect between the HPLMN and VPLMN, and does not have access to the data required to register the UE with the VPLMN itself.

Therefore, a UE roaming on a network which does not have SIP interconnect with the UE's home network is unable to make authenticated emergency calls. As explained above, authenticated emergency calls are preferable to unauthenticated emergency calls, and some PSAPs refuse to accept unauthenticated emergency calls. Therefore, this is a potentially serious problem.

SUMMARY

According to an aspect of the present invention, there is provided a method in a proxy call session control function, P-CSCF, of handling an unauthenticated emergency call originating from a roaming user equipment, UE, which is not attached to the P-CSCF. The P-CSCF receives a SIP INVITE request from the UE, the INVITE request relating to the unauthenticated emergency call, and determines an IP address of the UE. The P-CSCF sends an identity query to a policy and charging rules function, PCRF, indicating the IP address of the UE and requesting other identifiers of the UE, and receives one or more other identifiers of the UE from the PCRF. The P-CSCF constructs a TEL and/or SIP uniform resource identifier, URI, for the UE on the basis of at least one of said other identifiers, inserts the TEL and/or SIP URI into the SIP INVITE request, and sends the SIP INVITE request towards a public safety answering point, PSAP.

According to a further aspect, there is provided a method in a proxy call session control function, P-CSCF, of handling an emergency registration originating from a roaming user equipment, UE, which is not attached to the P-CSCF. The P-CSCF receives a session initiation protocol, SIP, REGISTER request from the UE, the REGISTER request relating to the emergency registration, and determines an IP address of the UE. The P-CSCF sends an identity query to a policy and charging rules function, PCRF, indicating that IP address of the UE and requesting other identifiers of the UE, and receives one or more other identifiers of the UE from the PCRF. The P-CSCF obtains a TEL and/or SIP uniform resource identifier, URI, for the UE on the basis of at least one of said other identities, and sends a 200 OK response to the UE in response to the SIP REGISTER request, the 200 OK response including the TEL and/or SIP URI.

According to a yet further aspect, there is provided a method of operating a policy and charging rules function, PCRF, for handling an emergency IMS call. The PCRF receives an identity request from a proxy call session control function, P-CSCF, the identity request comprising an IP address for a user equipment, UE, maps the IP address of the UE to one or more other identifiers of the UE, and sends said other identifiers to the P-CSCF.

According to a yet further aspect, there is provided a method of handling an IMS emergency call in roaming user equipment, UE. The UE sends a SIP REGISTER request relating to an emergency registration to a proxy call session control function, P-CSCF, of a visited PLMN, and receives an error response from the P-CSCF. The UE then sends a SIP INVITE request relating to an unauthenticated IMS emergency call to the P-CSCF.

According to a yet further aspect, there is provided an apparatus configured to operate as a P-CSCF. The apparatus comprises a first transceiver, a second transceiver, a third transceiver, and an unauthenticated emergency call processor. The first transceiver is configured to communicate with a roaming UE. The second transceiver is configured to communicate with a PCRF. The third transceiver is configured to communicate with a PSAP. The unauthenticated emergency call processor is configured to:
- receive, from the UE via the first transceiver, a session initiation protocol, SIP, INVITE request relating to an unauthenticated emergency call;
- determine an IP address of the UE;
- send an identity query to the PCRF via the second transceiver, indicating the IP address of the UE and requesting other identifiers of the UE;
- receive one or more other identifiers of the UE from the PCRF via the second transceiver;
- construct a TEL and/or SIP uniform resource identifier, URI, for the UE on the basis of at least one of the other identifiers;
- insert the TEL and/or SIP URI into the SIP INVITE request;
- send a second SIP INVITE request towards the PSAP, via the third transceiver.

According to a yet further aspect, there is provided an apparatus configured to operate as a P-CSCF. The apparatus comprises a first transceiver, a second transceiver, and an emergency registration request processor. The first transceiver is configured to communicate with a roaming UE. The second transceiver is configured to communicate with a PCRF. The emergency registration request processor is configured to:
- receive, from the UE via the first transceiver, a session initiation protocol, SIP, REGISTER request relating to an emergency registration;
- determine an IP address of the UE;
- send an identity query to the PCRF via the second transceiver, indicating the IP address of the UE and requesting other identifiers of the UE;
- receive one or more other identifiers of the UE from the PCRF via the second transceiver;
- obtain a TEL and/or SIP uniform resource identifier, URI, for the UE on the basis of at least one of the other identifiers;
- send a 200 OK response to the UE in response to the SIP REGISTER request via the second transceiver, the 200 OK response including the TEL and/or SIP URI.

According to a yet further aspect, there is provided an apparatus configured to operate as a PCRF. The apparatus comprises a transceiver and an identity request processor. The transceiver is configured to communicate with a P-CSCF. The identity request processor is configured to:
- receive an identity request from the P-CSCF via the transceiver, the identity request comprising an IP address for a user equipment, UE;
- map the IP address of the UE to one or more other identifiers of the UE;
- send the other identifiers to the P-CSCF via the transceiver.

According to a yet further aspect, there is provided an apparatus configured to operate as a UE. The apparatus comprises a transceiver and an emergency call processor. The transceiver is configured to communicate with an IMS network comprising a P-CSCF, wherein the UE is roaming on the IMS network. The emergency call processor is configured to:
- send a SIP REGISTER request relating to an emergency registration to the P-CSCF via the transceiver;
- receive an error response from the P-CSCF via the transceiver;
- send a SIP INVITE request relating to an unauthenticated emergency call to the P-CSCF via the transceiver.

According to a final aspect, there is provided a computer program comprising computer readable code which, when run on an apparatus causes the apparatus to perform one of the methods above.

Further embodiments of the invention are defined in the dependent claims.

DETAILED DESCRIPTION

In order to provide the identity of a roaming UE making an emergency call to the PSAP where no SIP interconnect with the UE's HPLMN exists, methods are proposed below to use the IP address of the UE to identify the UE sufficiently for an authenticated IMS emergency call to take place. Each of these methods relies on the network being able to trust the IP address of the UE, and may therefore be improved by the use of an IP address verification procedure such as that disclosed in WO2013/091735.

While the methods are intended for use where no SIP interconnect exists between the HPLMN and the VPLMN, it will be appreciated that they could also be used where such a SIP interconnect exists, e.g. as a fallback to conventional methods in case communication with a node of the HPLMN fails.

Figure 1:
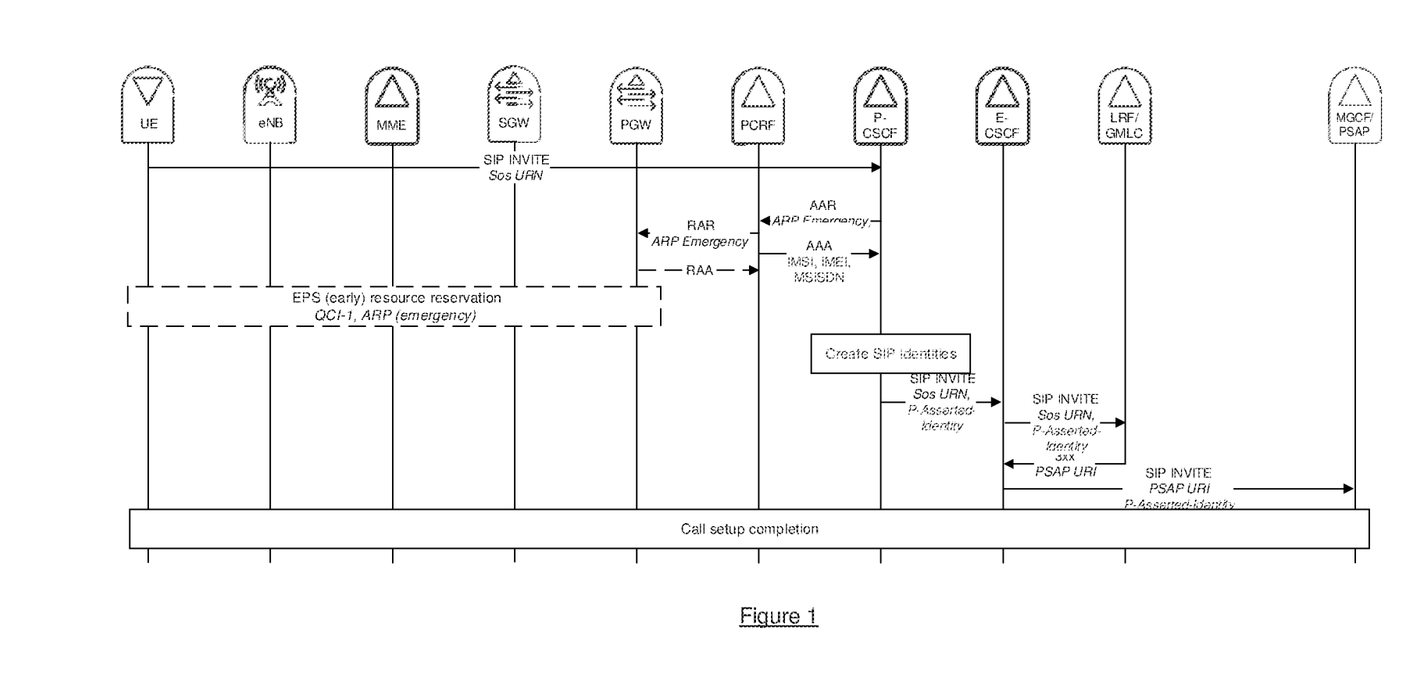
FIG. 1 is a signalling diagram according to an embodiment.

A first method is shown in FIG. 1. This method relates to the case where the UE attempts to make an unauthenticated IMS emergency call.

The UE sends a SIP INVITE to the P-CSCF. The SIP INVITE is for an unauthenticated IMS emergency call (e.g. containing an SOS URN in the recipient field). The P-CSCF retrieves the IP address of the UE from the SIP INVITE (for example, the source IP of the IP packet carrying the SIP INVITE request). The PCSCF then sends an AAA request to the PCRF, including the IP address, indicating that the request relates to an emergency call, and requesting other identities for the UE.

The PCRF sends a resource allocation request (RAR) to the PGW, which reserves resources for the emergency call and sends a resource allocation answer (RAA) to the PCRF. The PCRF uses the IP address of the UE to look up other identities for the UE, for example the IMSI, IMEI, and MSISDN of the UE registered with the IP-CAN. The PCRF includes these identities in an AAA response to the P-CSCF.

The P-CSCF uses the received identities to create a TEL and/or SIP URI for the UE. The process of creating the SIP URI will be explained in more detail later. The P-CSCF then sends the SIP INVITE to the E-CSCF, adding the URI for the UE into the "P-asserted-identity" field and thus providing the asserted identity of subscriber at the UE. The E-CSCF then proceeds to handle the emergency call as in current standards.

In this way, the PSAP is provided with a TEL and/or SIP URI which can be used to contact the UE, even in the case where the UE makes an unauthenticated IMS emergency call.

In this case, there is little disadvantage to a UE making an unauthenticated emergency call rather than an authenticated emergency call, and so the UE may be configured to respond to a failed attempt at emergency registration by immediately making an unauthenticated emergency call. The error response sent by the P-CSCF when the registration fails may indicate that the UE should do this.

Figure 2:
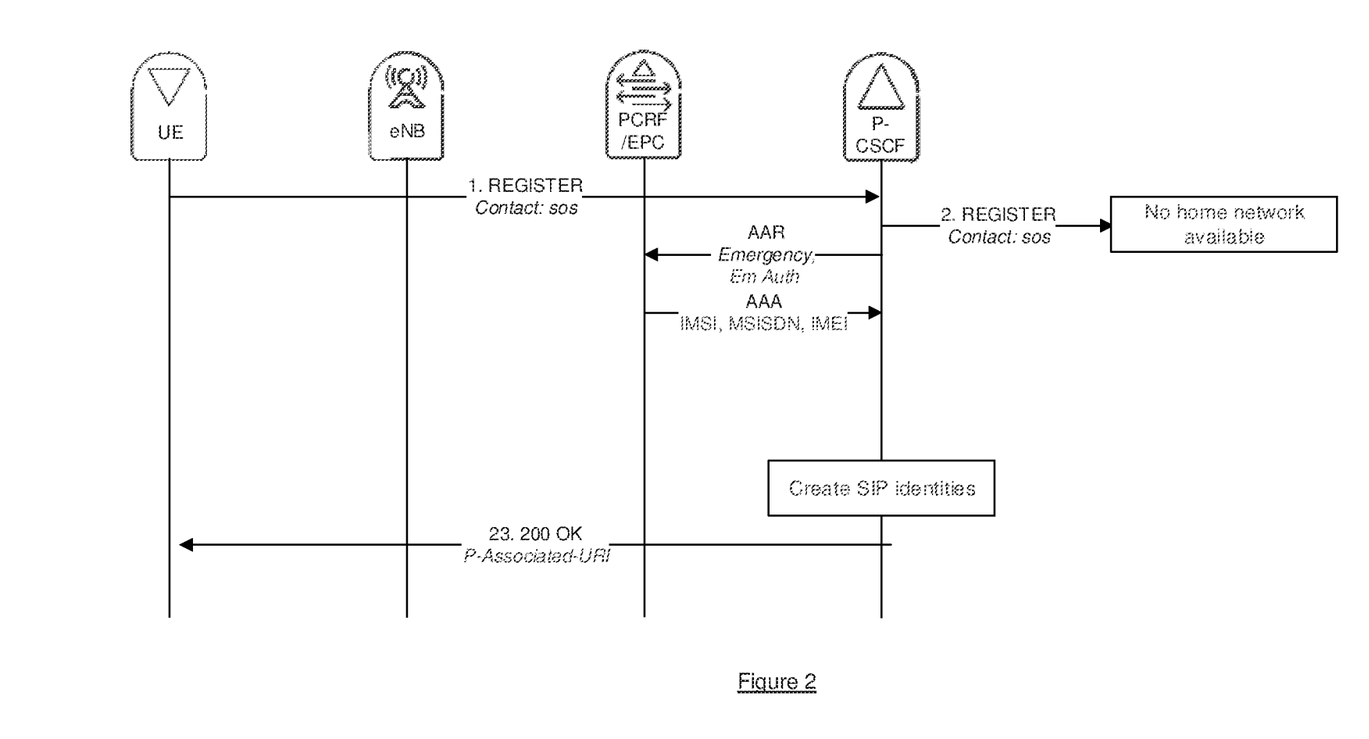
FIG. 2 is a signalling diagram according to a further embodiment.

Signalling for the second method is shown in FIG. 2. This method relates to the case where the UE is performing an emergency registration in order to make an authenticated IMS emergency call.

The UE sends a SIP REGISTER request to the P-CSCF, indicating that it is an emergency registration. The P-CSCF determines that no home network is available for the UE, either because it is aware that no SIP interconnect exists for the UE's HPLMN, or following a failure to contact the S-CSCF of the UE's HPLMN. The P-CSCF retrieves the IP address of the UE from the SIP REGISTER (for example, the source IP of the IP packet carrying the SIP INVITE request). The PCSCF then sends an AAA request to the PCRF, including the IP address, indicating that the request relates to an emergency call, and requesting other identities for the UE.

The PCRF uses the IP address of the UE to look up other identities for the UE, for example the IMSI, IMEI, and MSISDN of the UE registered with the IP-CAN. The PCRF includes these identities in an AAA response to the P-CSCF.

The P-CSCF uses the received identities to create a TEL and/or SIP URI for the UE. The process of creating the URI will be explained in more detail later. The P-CSCF includes the URI in the P-associated-URI field of a 200 OK response sent to the UE in response to the SIP REGISTER.

In order for this method to work, the UE must accept the 200 OK response without receiving the 410 response which would normally precede it when registering with the IMS. Also, the UE should accept the 200 OK response without requiring authentication of the P-CSCF or that an IPSec secure association is set up, as both of these procedures require data that is held in the HPLMN.

Given that this procedure is only to be used in an emergency, it is anticipated that the lack of security is acceptable in this case.

Once the UE has received the 200 OK response, it is registered with the IMS, and can make the emergency call as in current standards (except that as no IPSec secure association is set up, the signalling will not be encrypted under that association).

Figure 3:
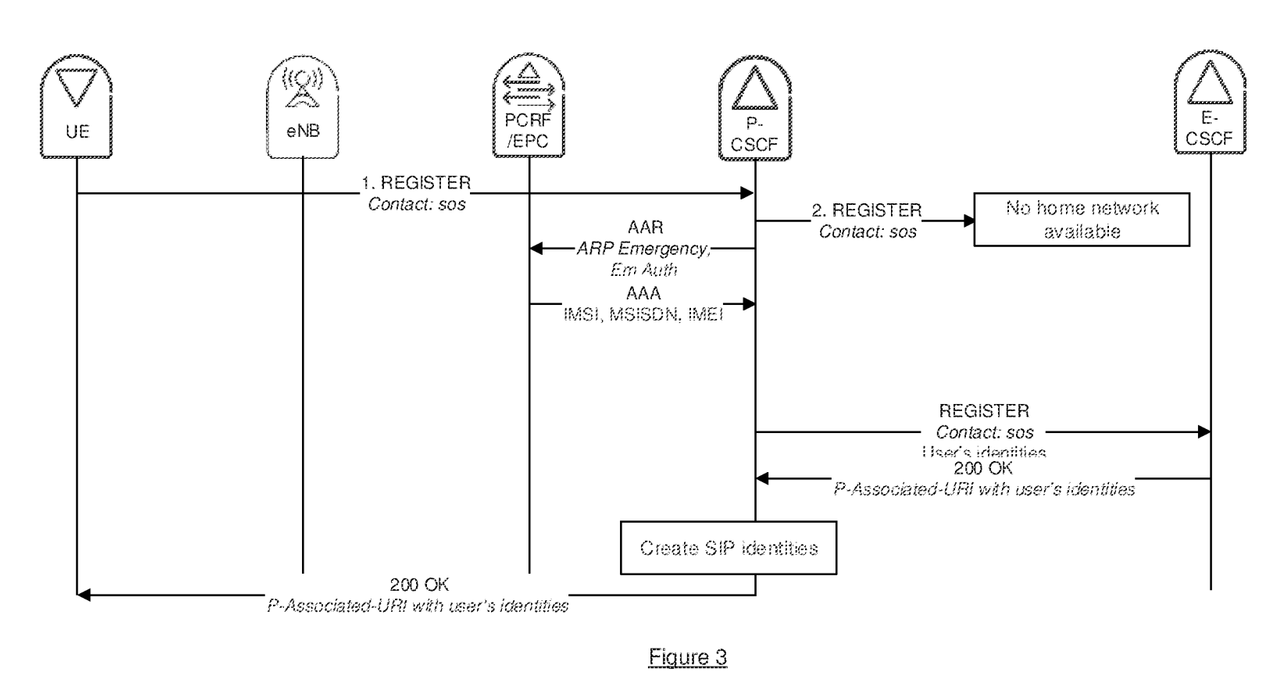
FIG. 3 is a signalling diagram according to a yet further embodiment.

The signalling for the third method is shown in FIG. 3. The third method is similar to the second method, except that the registration is performed at the E-CSCF or S-CSCF of the VPLMN, rather than at the P-CSCF. After constructing the TEL and/or SIP URI, the P-CSCF sends the SIP REGISTER request to the E/S-CSCF, and includes the TEL and/or SIP URI for the UE (e.g. the IMSI, IMEI, and MSISDN). The E/S-CSCF sends a 200 OK message with P-Associated-URI fields containing the URIs received from the P-CSCF, to the UE via the P-CSCF. Alternatively, the P-CSCF may send the SIP REGISTER request to the E-CSCF prior to constructing the TEL and/or SIP URI, and the E-CSCF will return a 200 OK message without any user identity in the P-Associated-URI fields. The P-CSCF then constructs the TEL and/or SIP URI and inserts the TEL and/or SIP URI into the P-Associated-URI fields of the 200 OK response before sending the 200 OK response to the UE. As a further alternative, the P-CSCF may provide the other identities for the UE to the E-CSCF in the SIP REGISTER message, and the E-CSCF may construct the TEL and/or SIP URI and insert it into the P-Associated-URI fields of a 200 OK response sent to the UE via the P-CSCF. Depending on the identities of the UE received from the PCRF, a valid TEL or SIP URI may be constructed for the UE in a variety of ways.

As a first option, if the MSISDN and IMSI of the UE are available, the MNC and MCC codes can be extracted from the IMSI, and the MSISDN can be converted into a global E.164 number. This can be used to construct a SIP URI for the UE of the form "[E.164]@ims.mnc[MNC].mcc[MCC].3gppnetwork.org". For example, if the MSISDN is 12125551212, and the IMSI is 234150999999999 then the SIP URI will be sip:+12125551212@ims.mnc015.mcc234.3gppnetwork.org; user=phone.

As a second option, if the MSISDN and the IMSI of the UE are available, the MNC and MCC codes can be extracted from the IMSI, and the MSISDN can be converted into a global E.164 number. The P-CSCF can then map the MNC and MCC codes onto a domain name using a mapping table which has previously been provided to the P-CSCF, and form a SIP URI using the global E.164 number and the domain name. For example, if the MSISDN is 12125551212, the IMSI is 234150999999999 and mapping table contains "ims.HPLMNoperator.com" for mnc=015 and mcc=234, then the SIP URI will be sip:+12125551212@ims.HPLMNoperator.com;user=phone.

As a third option, if only the IMSI is available, the P-CSCF can create a temporary IMPU for the UE based on the IMSI, as described in 3GPP TS 23.003 v 13.1.0, sub-clause 13.4B. The temporary IMPU is a SIP URI constructed in the form "[IMSI]@ims.mnc[MNC].mcc[MCC].3gppnetwork.org". For example, if the IMSI is 234150999999999, then the temporary IMPU will be sip: 234150999999999@ims.mnc015.mcc234.3gppnetwork.org.

A TEL URI may be constructed directly from the MSISDN.

Each of these options provides an identity which the PSAP can use to contact the UE if required, and which is sufficient to allow the UE to attach to the P-CSCF for the second or third methods presented above.

Figure 4:
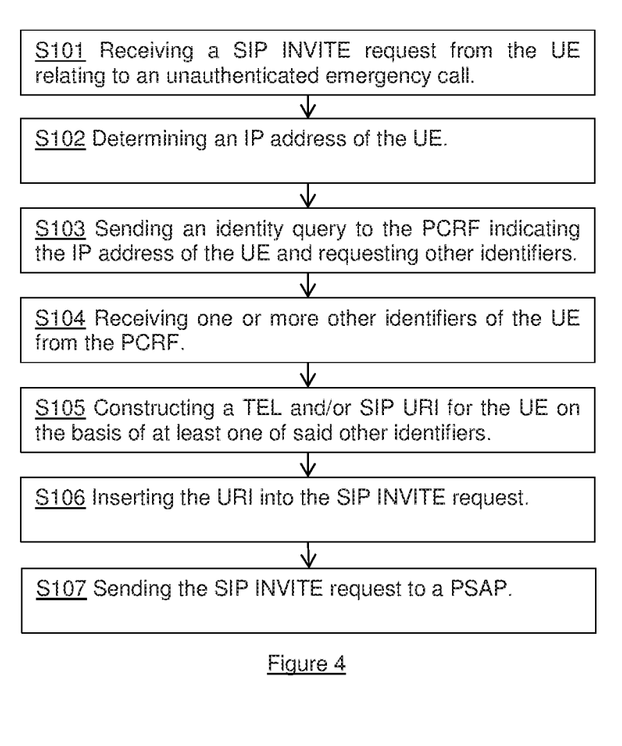
FIG. 4 is a flowchart of a method of operating a P-CSCF.

FIG. 4 is a flowchart showing a method of operating a P-CSCF. The P-CSCF receives (S101) a SIP INVITE request from the UE relating to an unauthenticated emergency call. The P-CSCF then determines (S102) an IP address of the UE, and sends (S103) an identity query to the PCRF indicating the IP address and requesting other identifiers for the UE. The P-CSCF receives (S104) one or more identifiers from the P-CSCF, and constructs (S105) a TEL and/or SIP URI for the UE on the basis of at least one of the identifiers. The P-CSCF then inserts (S106) the URI into the SIP INVITE request, and sends (S106) the SIP INVITE request to a PSAP.

Figure 5:
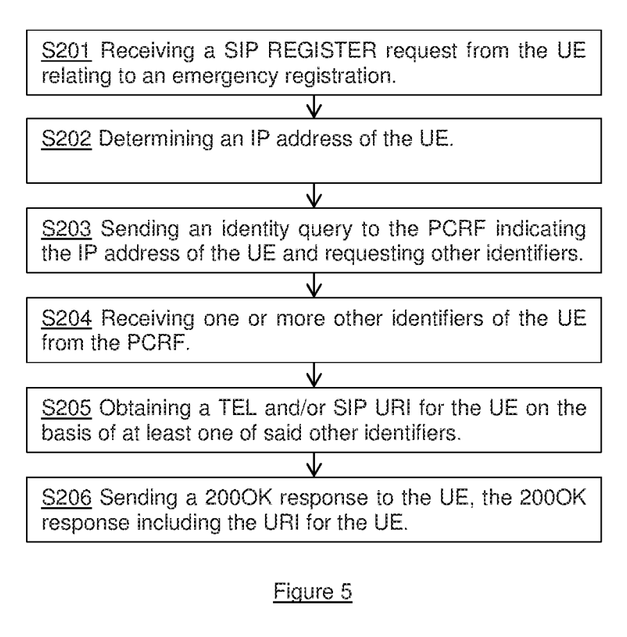
FIG. 5 is a flowchart of an alternative method of operating a P-CSCF.

FIG. 5 is a flowchart showing a method of operating a P-CSCF. The P-CSCF receives (S201) a SIP REGISTER request from the UE relating to an emergency registration. The P-CSCF determines (S202) an IP address of the UE and sends (S203) an identity query to the PCRF indicating the IP address and requesting other identifiers for the UE. The P-CSCF receives (S204) one or more identifiers from the PCRF, and obtains (S205) a TEL and/or SIP URI on the basis of at least one of the identifiers. The P-CSCF then sends (S206) a 200 OK response to the UE, including the TEL and/or SIP URI for the UE.

Figure 6:
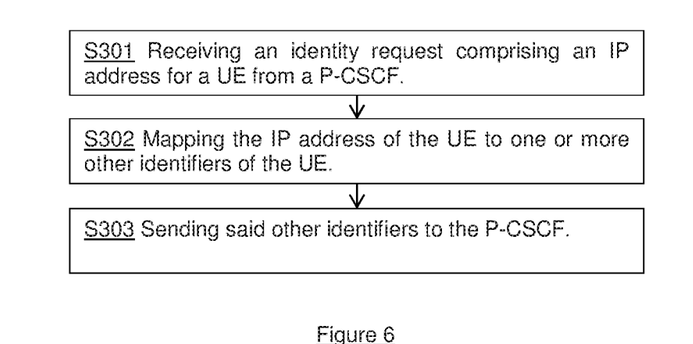
FIG. 6 is a flowchart of a method of operating a PCRF.

FIG. 6 is a flowchart showing a method of operating a PCRF for handling an emergency IMS call. The PCRF receives (S301) an identity request comprising an IP address for a UE from a P-CSCF. The PCRF maps (S302) the IP address of the UE to one or more other identifiers of the UE and sends (S303) the other identifiers to the P-CSCF.

Figure 7:
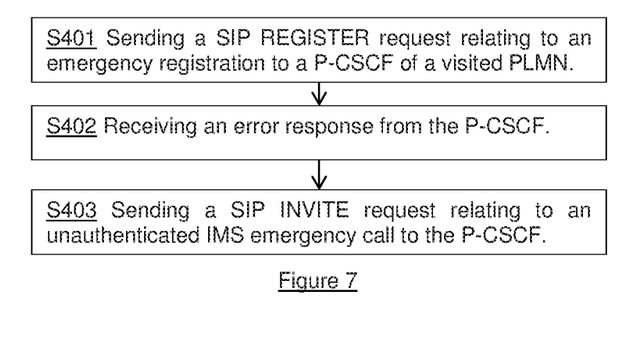
FIG. 7 is a flowchart of a method of operating a UE.

FIG. 7 is a flowchart showing a method of operating a UE. The UE sends (S401) a SIP REGISTER request to the P-CSCF of a visited PLMN. In response, the UE receives (S402) an error response from the P-CSCF. The UE then sends (S403) a SIP INVITE request relating to an unauthenticated IMS emergency call to the P-CSCF.

Figure 8:
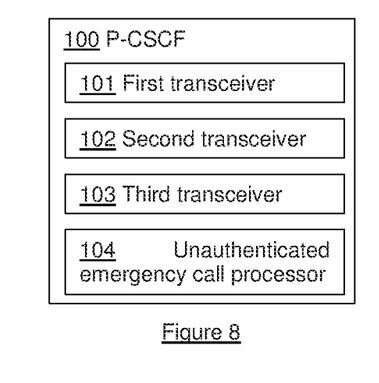
FIG. 8 is a schematic diagram of a P-CSCF.

FIG. 8 is a schematic diagram of an apparatus configured to operate as a P-CSCF (100). The apparatus comprises a first transceiver (101), a second transceiver (102), a third transceiver (103), and an unauthenticated emergency call processor (104). The first transceiver (101) is configured to communicate with a roaming UE. The second transceiver (102) is configured to communicate with a PCRF. The third transceiver (103) is configured to communicate with a PSAP. The unauthenticated emergency call processor (104) is configured to:
  receive, from the UE via the first transceiver, a session initiation protocol, SIP, INVITE request relating to an unauthenticated emergency call;
  determine an IP address of the UE;
  send an identity query to the PCRF via the second transceiver, indicating the IP address of the UE and requesting other identifiers of the UE;
  receive one or more other identifiers of the UE from the PCRF via the second transceiver;
  construct a TEL and/or SIP uniform resource identifier, URI, for the UE on the basis of at least one of the other identifiers;
  insert the URI into the SIP INVITE request;
  send a second SIP INVITE request to the PSAP, via the third transceiver.

Figure 9:
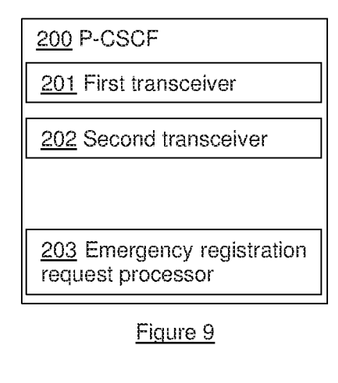
FIG. 9 is a schematic diagram of an alternative P-CSCF.

FIG. 9 is a schematic diagram of an apparatus configured to operate as a P-CSCF (200). The apparatus comprises a first transceiver (201), a second transceiver (202), and an emergency registration request processor (203). The first transceiver (201) is configured to communicate with a roaming UE. The second transceiver (202) is configured to communicate with a PCRF. The emergency registration request processor (203) is configured to:
  receive, from the UE via the first transceiver, a session initiation protocol, SIP, REGISTER request relating to an emergency registration;
  determine an IP address of the UE;
  send an identity query to the PCRF via the second transceiver, indicating the IP address of the UE and requesting other identifiers of the UE;
  receive one or more other identifiers of the UE from the PCRF via the second transceiver;
  obtain a TEL and/or SIP uniform resource identifier, URI, for the UE on the basis of at least one of the other identifiers;
  send a 200 OK response to the UE in response to the SIP REGISTER request via the second transceiver, the 200 OK response including the URI.

Figure 10:
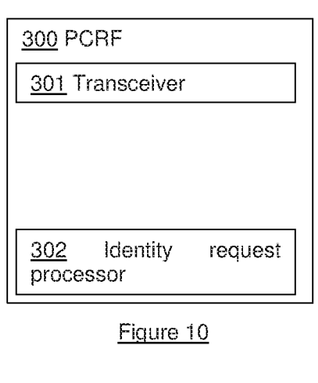
FIG. 10 is a schematic diagram of a PCRF; and,
FIG. 11 is a schematic diagram of a UE.

FIG. 10 is a schematic diagram of an apparatus configured to operate as a PCRF (300). The apparatus comprises a transceiver (301) and an identity request processor (302). The transceiver (301) is configured to communicate with a P-CSCF. The identity request processor (302) is configured to:
  receive an identity request from the P-CSCF via the transceiver, the identity request comprising an IP address for a user equipment, UE;
  map the IP address of the UE to one or more other identifiers of the UE;
  send the other identifiers to the P-CSCF via the transceiver.

Figure 11:
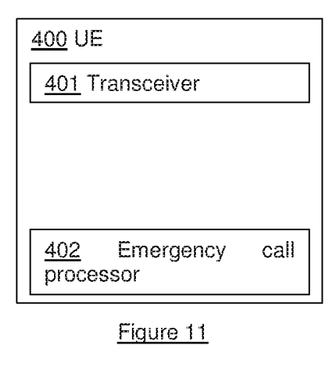

FIG. 11 is a schematic diagram of an apparatus configured to operate as a UE (400). The apparatus comprises a transceiver (401) and an emergency call processor (402). The transceiver (401) is configured to communicate with an IMS network comprising a P-CSCF, wherein the UE is roaming on the IMS network. The emergency call processor (402) is configured to:
  send a SIP REGISTER request relating to an emergency registration to the P-CSCF via the transceiver;
  receive an error response from the P-CSCF via the transceiver;
  send a SIP INVITE request relating to an unauthenticated emergency call to the P-CSCF via the transceiver.

The methods described above may be implemented by a computer program which, when run on an apparatus, causes the apparatus to perform the method.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of operating a proxy call session control function ("P-CSCF") to handle an emergency registration originating from a user equipment ("UE") that is roaming and not attached to the P-CSCF, the method comprising:
  receiving a session initiation protocol ("SIP") REGISTER request from the UE, the REGISTER request relating to the emergency registration;
  determining an internet protocol ("IP") address of the UE from the SIP REGISTER request;
  sending an identity query to a policy and charging rules function ("PCRF") indicating the IP address of the UE and requesting other identifiers of the UE;
  receiving one or more other identifiers of the UE from the PCRF, the one or more identifiers comprising at least one of an international mobile subscriber identity ("IMSI") and a mobile subscriber integrated services digital network number ("MSISDN");
  obtaining a telephone ("TEL') and/or SIP uniform resource identifier ("URI") for the UE on the basis of at least one of the one or more other identifiers; and
  responsive to receiving the SIP REGISTER request, sending a 200 OK response to the UE-including the TEL and/or SIP URI,
  wherein obtaining the TEL and/or SIP URI comprises:
    responsive to the MSISDN being the only identifier received:

constructing the TEL URI from the MSISDN; or
responsive to the MSISDN and the IMSI being the identifiers received:
extracting mobile network code ("MNC") and mobile country code ("MCC") codes from the IMSI; and
constructing the SIP URI from the MSISDN and the MNC and MCC codes.

2. The method of claim 1, wherein obtaining the TEL and/or SIP URI comprises:
sending a second SIP REGISTER request to an emergency call session control function ("E-CSCF") the second SIP REGISTER request identifying the UE and comprising at least one of the one or more other identifiers; and
receiving a 200 OK response from the E-CSCF, the 200 OK response including the TEL and/or SIP URI.

3. The method of claim 1, further comprising:
modifying the SIP REGISTER request to include the TEL and/or SIP URI;
sending the SIP REGISTER request to the E-CSCF; and
receiving the 200 OK response including the TEL and/or SIP URI from the E-CSCF.

4. The method of claim 1, wherein a received identifier is an international mobile subscriber identity ("IMSI"), and
wherein obtaining the TEL and/or SIP URI comprises constructing a temporary IP multimedia public identity ("IMPU") based on the IMSI.

5. The method of claim 1, wherein constructing the SIP URI from the MSISDN and the MNC and MCC codes comprises:
converting the MSISDN to a global E.164 number; and
constructing the SIP URI of the form:
"[E.164 number]@ims.mnc[MNC].mcc[MCC].3gpp-network.org".

6. The method of claim 1, wherein constructing the SIP URI from the MSISDN and the MNC and MCC codes comprises:
mapping the MNC and MCC to a domain name using a mapping table in the P-CSCF;
converting the MSISDN to a global E.164 number; and
constructing the SIP URI from the global E.164 number and the domain name.

7. The method of claim 1, further comprising receiving, from the PCRF, an indication that the UE is authenticated in a packet core.

8. A non-transitory computer readable medium having instructions stored therein that are executable by processing circuitry of a proxy call session control function ("P-CSCF") to cause the P-CSCF to perform operations comprising:
receiving a session initiation protocol ("SIP") REGISTER request from the UE, the REGISTER request relating to the emergency registration;
determining an internet protocol ("IP") address of the UE;
sending an identity query to a policy and charging rules function ("PCRF") indicating the IP address of the UE and requesting other identifiers of the UE;
receiving one or more other identifiers of the UE from the PCRF, the one or more identifiers comprising at least one of an international mobile subscriber identity ("IMSI") and a mobile subscriber integrated services digital network number ("MSISDN");
obtaining a telephone ("TEL') and/or SIP uniform resource identifier ("URI") for the UE on the basis of at least one of the one or more other identifiers; and
responsive to receiving the SIP REGISTER request, sending a 200 OK response to the UE-including the TEL and/or SIP URI,
wherein obtaining the TEL and/or SIP URI comprises:
responsive to the MSISDN being the only identifier received:
constructing the TEL URI from the MSISDN; or
responsive to the MSISDN and the IMSI being the identifiers received:
extracting mobile network code ("MNC") and mobile country code ("MCC") codes from the IMSI; and
constructing the SIP URI from the MSISDN and the MNC and MCC codes.

9. The non-transitory computer readable medium of claim 8, wherein obtaining the TEL and/or SIP URI comprises:
sending a second SIP REGISTER request to an emergency call session control function ("E-CSCF") the second SIP REGISTER request identifying the UE and comprising at least one of the one or more other identifiers; and
receiving a 200 OK response from the E-CSCF, the 200 OK response including the TEL and/or SIP URI.

10. The non-transitory computer readable medium of claim 8, the operations further comprising:
modifying the SIP REGISTER request to include the TEL and/or SIP URI;
sending the SIP REGISTER request to the E-CSCF; and
receiving the 200 OK response including the TEL and/or SIP URI from the E-CSCF.

11. The non-transitory computer readable medium of claim 8, wherein a received identifier is an international mobile subscriber identity ("IMSI"), and
wherein obtaining the TEL and/or SIP URI comprises constructing a temporary IP multimedia public identity ("IMPU") based on the IMSI.

12. The non-transitory computer readable medium of claim 8, wherein constructing the SIP URI from the MSISDN and the MNC and MCC codes comprises:
converting the MSISDN to a global E.164 number; and
constructing the SIP URI of the form:
"[E.164 number]@ims.mnc[MNC].mcc[MCC].3gpp-network.org".

13. The non-transitory computer readable medium of claim 8, wherein constructing the SIP URI from the MSISDN and the MNC and MCC codes comprises:
mapping the MNC and MCC to a domain name using a mapping table in the P-CSCF;
converting the MSISDN to a global E.164 number; and
constructing the SIP URI from the global E.164 number and the domain name.

14. The non-transitory computer readable medium of claim 8, further comprising receiving, from the PCRF, an indication that the UE is authenticated in a packet core.

15. A system for handling an emergency registration originating from a roaming user equipment ("UE") that is not attached to a proxy call session control function ("P-CSCF"), the system comprising:
a non-transitory memory; and
a processor configured to execute instructions from the non-transitory memory to cause the system to perform operations comprising:
receiving a session initiation protocol ("SIP") REGISTER request from the UE, the REGISTER request relating to the emergency registration;
determining an internet protocol ("IP") address of the UE;

sending an identity query to a policy and charging rules function ("PCRF") indicating the IP address of the UE and requesting other identifiers of the UE;
receiving one or more other identifiers of the UE from the PCRF, the one or more identifiers comprising at least one of an international mobile subscriber identity ("IMSI") and a mobile subscriber integrated services digital network number ("MSISDN");
obtaining a telephone ("TEL') and/or SIP uniform resource identifier ("URI") for the UE on the basis of at least one of the one or more other identifiers; and
responsive to receiving the SIP REGISTER request, sending a 200 OK response to the UE-including the TEL and/or SIP URI,
wherein obtaining the TEL and/or SIP URI comprises:
  responsive to the MSISDN being the only identifier received:
    constructing the TEL URI from the MSISDN; or
  responsive to the MSISDN and the IMSI being the identifiers received:
    extracting mobile network code ("MNC") and mobile country code ("MCC") codes from the IMSI, and
    constructing the SIP URI from the MSISDN and the MNC and MCC codes.

16. The system of claim 15, wherein obtaining the TEL and/or SIP URI comprises:
sending a second SIP REGISTER request to an emergency call session control function ("E-CSCF") the second SIP REGISTER request identifying the UE and comprising at least one of the one or more other identifiers; and
receiving a 200 OK response from the E-CSCF, the 200 OK response including the TEL and/or SIP URI.

17. The system of claim 15, the operations further comprising:
modifying the SIP REGISTER request to include the TEL and/or SIP URI;
sending the SIP REGISTER request to the E-CSCF; and
receiving the 200 OK response including the TEL and/or SIP URI from the E-CSCF.

18. The system of claim 15, wherein constructing the SIP URI from the MSISDN and the MNC and MCC codes comprises:
converting the MSISDN to a global E.164 number; and
constructing the SIP URI of the form:
  "[E.164 number]@ims.mnc[MNC].mcc[MCC].3gpp-network.org".

19. The system of claim 15, wherein constructing the SIP URI from the MSISDN and the MNC and MCC codes comprises:
mapping the MNC and MCC to a domain name using a mapping table in the P-CSCF;
converting the MSISDN to a global E.164 number; and
constructing the SIP URI from the global E.164 number and the domain name.

20. The system of claim 15, further comprising receiving, from the PCRF, an indication that the UE is authenticated in a packet core.

* * * * *

UNITED STATES PATENT AND TRADEMARK OFFICE
CERTIFICATE OF CORRECTION

PATENT NO. : 11,146,939 B2
APPLICATION NO. : 16/415119
DATED : October 12, 2021
INVENTOR(S) : Lindholm et al.

Page 1 of 1

It is certified that error appears in the above-identified patent and that said Letters Patent is hereby corrected as shown below:

On the Title Page

In Item (60), under "Related U.S. Application Data", in Column 1, Line 3, delete "2015." and insert -- 2015, now Pat. No. 11,032,688, --, therefor.

In the Specification

In Column 1, Line 7, delete "2017," and insert -- 2017, now Pat. No. 11,032,688, --, therefor.

Signed and Sealed this
Eighth Day of March, 2022

Drew Hirshfeld
*Performing the Functions and Duties of the
Under Secretary of Commerce for Intellectual Property and
Director of the United States Patent and Trademark Office*